(12) United States Patent
Dyke et al.

(10) Patent No.: US 6,359,906 B1
(45) Date of Patent: Mar. 19, 2002

(54) PROVIDING DIGITAL SERVICES TO TELEPHONE SUBSCRIBERS

(75) Inventors: Peter John Dyke, Saffron Walden; Michael Philip Dyer, Stansted; Peter John Etter, Sawbridgeworth, all of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/028,540

(22) Filed: Feb. 24, 1998

(51) Int. Cl.$^7$ .............................. H04J 1/00; H04J 15/00
(52) U.S. Cl. ........................ 370/480; 370/464; 370/465
(58) Field of Search ................................. 370/464, 465, 370/485, 488, 490, 493, 495, 497, 480, 478

(56) References Cited

U.S. PATENT DOCUMENTS 5,889,856 A * 3/1999 O'Toole et al. ............. 379/399
6,067,316 A * 5/2000 Amrany et al. ............. 375/220

* cited by examiner

Primary Examiner—Wellington Chin
Assistant Examiner—Brenda H. Pham
(74) Attorney, Agent, or Firm—Lee, Mann, Smith, McWilliams, Sweeney & Ohlson

(57) ABSTRACT

A local telecommunications network system IS arranged to provide a first asymmetric digital subscriber line (ADSL) service in a first frequency band to a first set of subscribers and a second very high bit rate digital subscriber line (VDSL) service in a second frequency band higher than the first frequency band to a second set of subscribers. Interference between the two types of digital traffic within the multi-pair feeder cables leading to the exchange is suppressed by low pass filtering the ADSL traffic and high pass filtering the VDSL traffic. The filtering may be applied to the line cards to which each subscriber line is connected.

10 Claims, 5 Drawing Sheets

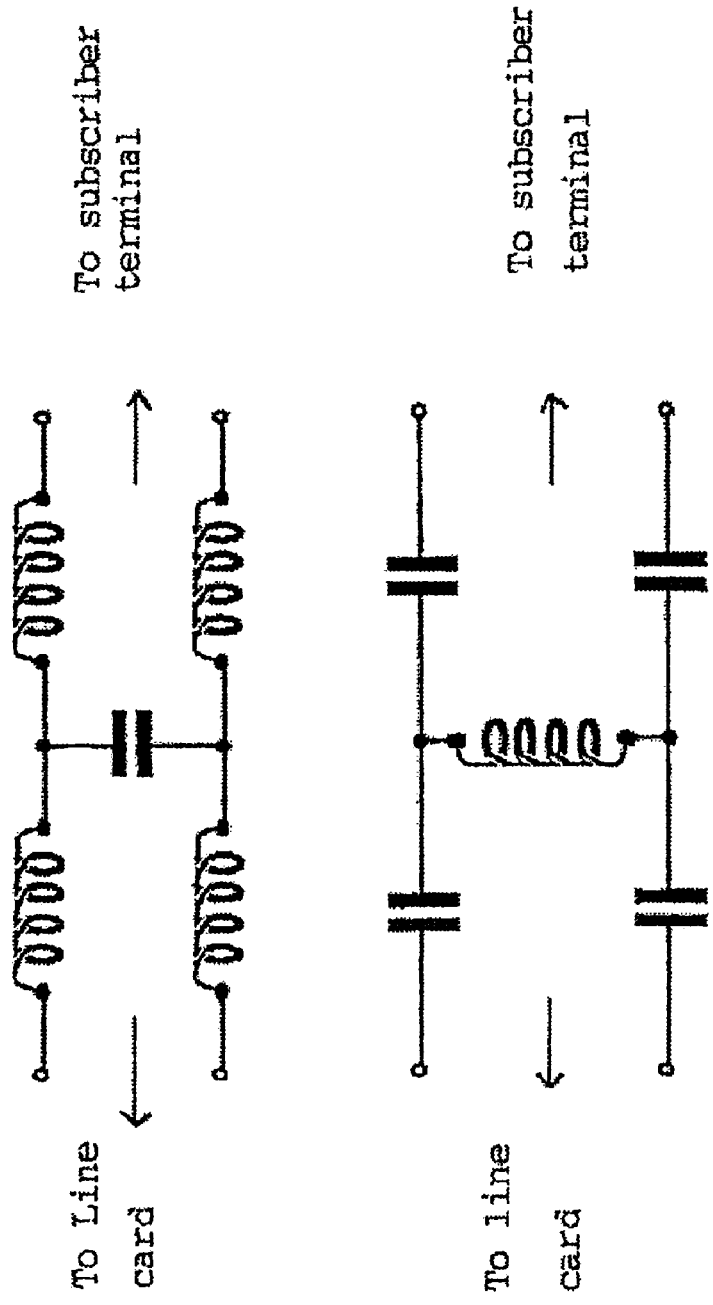

PROVIDING DIGITAL SERVICES TO TELEPHONE SUBSCRIBERS

This invention relates to arrangements and methods for providing digital services to telephone subscribers via the subscriber loop.

BACKGROUND OF THE INVENTION

In a conventional telephone system, the majority of subscribers are connected to local exchanges via twisted conductor pairs, generally referred to as subscriber loops. Between the subscribers and the exchange, the subscriber loops are carried in cables each containing a large number of conductor pairs. The cables issuing from the exchange feed smaller street cables from which the individual subscriber loops are 'dropped' to provide the final link to the subscriber. These twisted pair subscriber loops, were originally installed to carry voice services, but are now being used by the system operators to carry digital services such as ADSL (asymmetric digital subscriber line) in the frequency spectrum above the baseband frequencies used for the voice or POTS (plain ordinary telephone service) traffic. Typically, a duplex service such as ADSL is launched on to the subscriber loop at each end and may carry e.g. video and/or Internet traffic to the subscriber.

The currently employed ADSL service is a broad band technology which occupies a frequency band above that of voice to provide high bit rate (asymmetric) services to customers. Typically this service uses discrete multi-tone technology (DMT) at frequencies from as low as 26 kHz up to about 1.1 MHz at a downstream bit rate of 2 Mb/s or multiples thereof. For example, bit rates of 6 Mb/s may be used over short distances. A particular concern of service providers is the freedom to introduce new digital services that do not destabilise existing services and can operate in parallel with those services that are currently in use. Specifically, there are now proposals to introduce VDSL (very high bit rate digital subscriber line) services primarily for business customers to carry large volumes of data traffic. These services will typically use frequencies above 1.2 MHz, i.e. above the upper frequency limit for current ADSL services. It is a particular concern of the various Standards Bodies who ultimately control the widespread introduction of services that any new service should not disturb currently established services or compromise bandwidth that might be required in the future.

In order that system operators can be persuaded to introduce the a VDSL service to business subscribers, they will thus need assurance that this service introduction will have no adverse effect on their existing ADSL subscribers and, conversely, that the VDSL services can operate successfully in the presence of ADSL traffic. The latter is essential to the successful introduction of VDSL to ensure that a high quality reliable service is delivered to the customer.

We have found that when attempts are made to provide these two services to subscribers from an exchange, mutual interference can arise between subscriber lines in the transmission path from the exchange. The exchange is fed by large multi-pair cables in which the lines of a large number of subscribers are bundled together, and interference, generally referred to as cross-talk, can occur when the lines of two subscribers receiving respectively the two services are disposed adjacent each other in such a feeder cable. One solution to this problem is to provide physical separation of the subscriber lines carrying the two different services by bundling the VDSL subscriber lines into a separate feeder cable thus providing complete isolation of this traffic. This is a simple and effective solution, but in practice it can prove costly as it involves a significant investment in new cabling and/or reallocation of conductor pairs before the service can be offered to subscribers. A further effective solution to the problem is to increase the spectral guard band between the services to a level at which the interference becomes negligible. This however is costly in bandwidth which is a strictly limited and valuable commodity and is thus unattractive to the system operators.

SUMMARY OF THE INVENTION

It is an object of the invention to minimise or to overcome this disadvantage.

A further object of the invention is to provide an improved arrangement and method for the delivery of digital services to a telephone subscriber.

A further object of the invention is to provide an arrangement and method for providing ADSL and VDSL services to telecommunications customers via a common exchange or switch.

According to a first aspect of the invention there is provided a local telecommunications network system arranged to provide first and second services in respective first and second frequency bands to system subscribers, the system comprising an exchange or switch to which the subscribers are coupled each via a respective subscriber loop, means for applying said first service to selected subscriber loops, means for applying said second service to other selected subscriber loops, first filter means associated with said selected subscriber loops, and second filter means associated with said other subscriber loops, wherein each said filter means is arranged to provide a band edge cut-off of its respective first or second frequency band so as to inhibit interference of service-carrying signals between said first and second frequency bands. According to a further aspect of the invention there is provided a local telecommunications network system arranged to provide a first asymmetric digital subscriber line (ADSL) service in a first frequency band to a first set of subscribers and a second very high bit rate digital subscriber line (VDSL) service in a second frequency band higher than said first frequency band to a second set of subscribers, the system comprising an exchange or switch to which the subscribers are coupled each via a respective subscriber loop, first line card means for applying said ADSL service to selected subscriber loops, second line card means for applying said VDSL service to other selected subscriber loops, first low-pass filter means associated with said first line card means, and second high-pass filter means associated with said second line card means, wherein each said filter means is arranged to provide a band edge cut-off of its respective first or second frequency band so as to inhibit interference of service-carrying signals between said first and second frequency bands.

According to a further aspect of the invention there is provided a local telecommunications network system arranged to provide a first asymmetric digital subscriber line (ADSL) service in a first frequency band to a first set of subscribers and a second very high bit rate digital subscriber line (VDSL) service in a second frequency band higher than said first frequency band to a second set of subscribers, the system comprising an exchange or switch to which the subscribers are coupled each via a respective subscriber loop, first line card means for applying said ADSL service to selected subscriber loops, second line card means for applying said VDSL service to other selected subscriber loops, a main distribution frame associated with the exchange and whereby each subscriber loop is coupled to its respective line card means, each said subscriber loop having said ADSL service being further coupled via a POTS splitter and the main distribution frame to a further telephony line card, first low pass filter means associated with said first line card means, and second high pass filter means associated with said second line card means, wherein each said filter means is arranged to provide a band edge cut-off of its respective first or second frequency band so as to inhibit interference of service-carrying signals between said first and second frequency bands.

According to another aspect of the invention there is provided a method of providing first and second services in respective first and second frequency bands to subscribers in a local telecommunications network system comprising an exchange or switch to which the subscribers are coupled each via a respective subscriber loop, first line card means for applying said first service to selected subscriber loops, second line card means for applying said second service to other selected subscriber loops, the method comprising low pass filtering traffic on subscriber loops carrying said first service, and high pass filtering traffic on subscriber loops carrying said second service so as to inhibit interference of service-carrying signals between said first and second frequency bands.

We have found that by providing low pass filtering of the ADSL traffic and high pass filtering of the VDSL traffic, the two types of traffic can co-exist within a multi-pair cable without the risk of mutual interference. This allows the introduction of VDSL services at low cost to the system operator and without the need for additional cabling expense.

The low pass and high-pass filters may comprise balanced-T inductor/capacitor circuits.

Advantageously, the low pass and high pass filtering can be applied via a notch filter of common design.

In a preferred embodiment, the filtering is applied to the subscriber line card at the exchange.

BRIEF DESCRIPTION OF THE DRAWINGS

An embodiment of the invention will now be described with reference to the accompanying drawings in which:

FIG. 3 illustrates a low-pass filter construction for use in the network of FIG. 1;

FIG. 4 illustrates a high-pass filter construction for use in the network of FIG. 1;

DESCRIPTION OF PREFERRED EMBODIMENT

Figure 1:
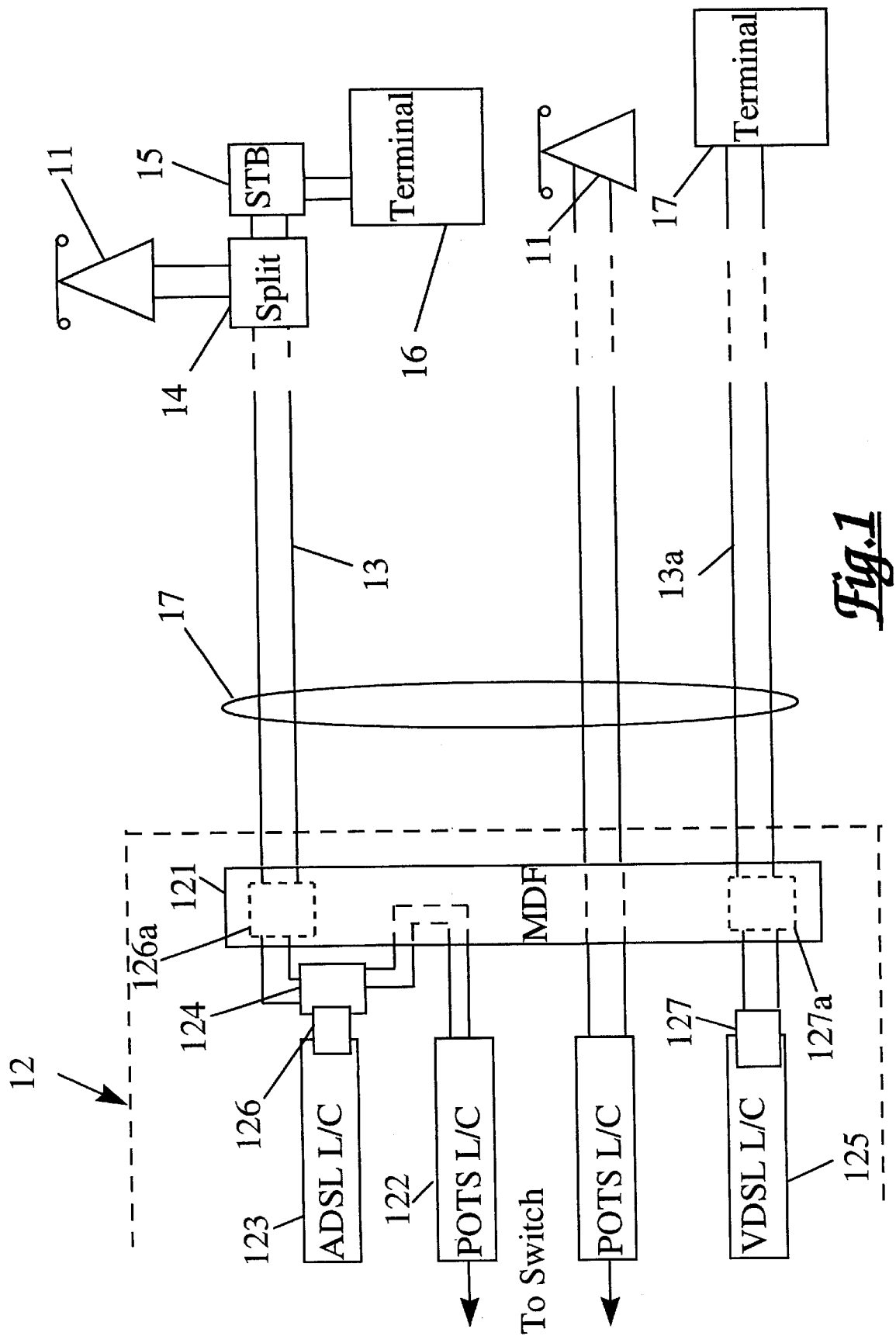
FIG. 1 is a schematic diagram of a telecommunications network providing ADSL and VDSL services to subscribers.

Referring to FIG. 1, this shows in schematic form a local telecommunications network in which subscriber terminals 11 are served from a local exchange generally indicated as 12 each via a respective subscriber loop 13. Typically, each subscriber loop or line 13 comprises a twisted pair of wire conductors. In the network of FIG. 1, some subscribers receive simply a telephone or POTS service. Other subscribers, generally residential or small business, receive an ADSL service in addition to their POTS service, while yet other subscribers, generally medium or large business, receive a VDSL service. For clarity, only those parts of the exchange necessary for the understanding of the invention are depicted in FIG. 1, and in particular the switch associated with the exchange is not shown.

The exchange 12 comprises a main distribution frame (MDF) 121 from which the subscriber loops serving the subscribers are distributed. Each subscriber receiving a POTS service at his telephone terminal 11 is provided with a corresponding telephony line card 122 disposed on the exchange side of the MDF. Those subscribers who also receive an ADSL service are provided each with a further ADSL line card 123 which is coupled to the subscriber line on the exchange side of the MDF 121 via a POTS splitter 124. Those subscribers receiving a VDSL service normally receive this service via a subscriber loop 13a which is dedicated to this type of traffic, i.e. it does not carry POTS traffic, and which is served from the exchange side of the MDF by a respective VDSL line card 125.

Those subscribers receiving the ADSL service will normally have a POTS splitter 14 which routes POTS traffic to the telephone 11 and ADSL traffic via a local set top box (STB) 15 to a user terminal 16. Each VDSL subscriber will generally have a user terminal 17 coupled to the loop 13a, the POTS traffic to that subscriber being carried on one or more separate subscriber loops (not shown). It will be understood that the business customers for whom the VDSL service is intended will normally have a number of subscriber loops or lines to accommodate the corresponding volume of telephone traffic.

The subscriber loops feeding the exchange are bundled into multi-pair feeder cables 17 and the loops of many subscribers will be disposed adjacent one another in such cables thus providing a potential opportunity for crosstalk.

Figure 2:
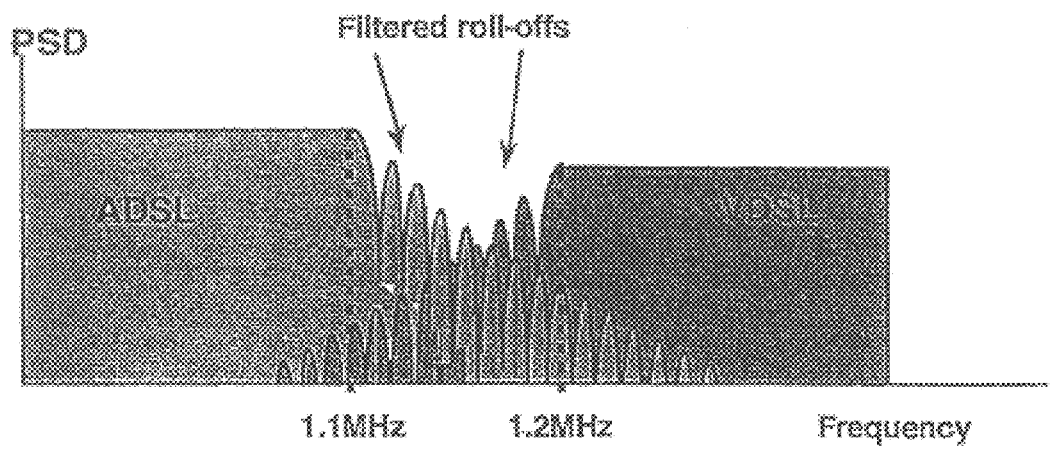
FIG. 2 is a frequency spectrum diagram illustrating the band occupancy of ADSL and VDSL services.

Referring now to FIG. 2, this illustrates the typical frequency spectrum of ADSL and VDSL signals and shows the relationship between power spectral density (PSD) and frequency. Each type of traffic is allocated to a respective frequency band, the two bands being separated by a guard band of about 100 kHz. Although each type of traffic is nominally confined to its respective band, there is in fact a spill-over of harmonics and sub-harmonics at the respective band edges so that interference from each band extends into the other. Although the interference in the guard band is out of band for both services, it can become reflected into the in-band spectrum of either service as a result of aliasing due to over-sampling which is a feature of the digital signal processing (DSP) methods that are generally employed for these signals. As a subscriber will normally receive only one of these two services, this potential mutual interference would not immediately be expected to pose a significant cross-talk problem to the subscriber. However, as discussed above, we have found that there is a considerable risk of such interference where the subscriber pairs carrying the respective ADSL and VDSL services become disposed adjacent each other in one of the multi-pair cables feeding the exchange. This interference or cross-talk can be of sufficient magnitude to impair the performance of VDSL systems.

Referring again to FIG. 1, potential interference between the ADSL and VDSL services is suppressed by respective high pass and low pass filters 126 and 127. Advantageously, as depicted in FIG. 1, each filter is disposed on the corresponding line card which is manufactured in high volume and thus at low cost. Alternatively, the filters can be implemented on the MDF as indicated in broken lines at 126a and 127a, this being appropriate for 'retrofit' operations on existing ADSL lines thus avoiding the need for immediate line card replacement on those lines.

In a further embodiment (not shown) the filters may be disposed in the connections between the line cards and the MDF.

In one embodiment of the invention, separate low-pass and high pass filters may be employed, suitable constructions being illustrated in FIGS. 3 and 4 respectively. In each case the filter comprises a balanced-T inductor/capacitor arrangement. The component values are chosen to provide the desired band edge cut off when inserted in a subscriber loop having a nominal impedance of 100 ohms. Conveniently, these filters may be disposed on the MDF so as to provide coupling between the respective line cards and the legs of the corresponding subscriber loop.

Figure 5:
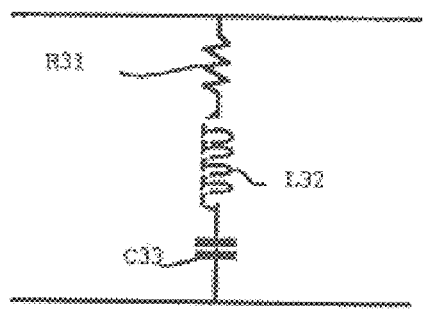
FIG. 5 illustrates in schematic form a notch filter construction for use in the network of FIG. 1.

As discussed above, the ADSL filters provide a low pass function and the VDSL filters provide a high pass function. These two functions can also be achieved by the use of a notch filter whose stop band corresponds to the guard band between the two services. A suitable filter construction is illustrated in FIG. 5 and consists of a damped shunt resonator circuit comprising resistor R31, inductor L32 and capacitor C33. The component values are chosen to match the desired pass band and to match a nominal line impedance typically of 100 ohms at the notch frequency. For example, a combination of 10 ohms resistance, 407 microhenries inductance and 47 picofarads capacitance provides an appropriate notch characteristic and a Q value of about 300 at the notch centre frequency.

The use of a notch filters is particularly advantageous when the filters are disposed on the MDF 121 (FIG. 1) at position 126a and/or 127a, as each filter can then be placed or shunted across the respective copper pair rather than in a series connection.

Figure 6:
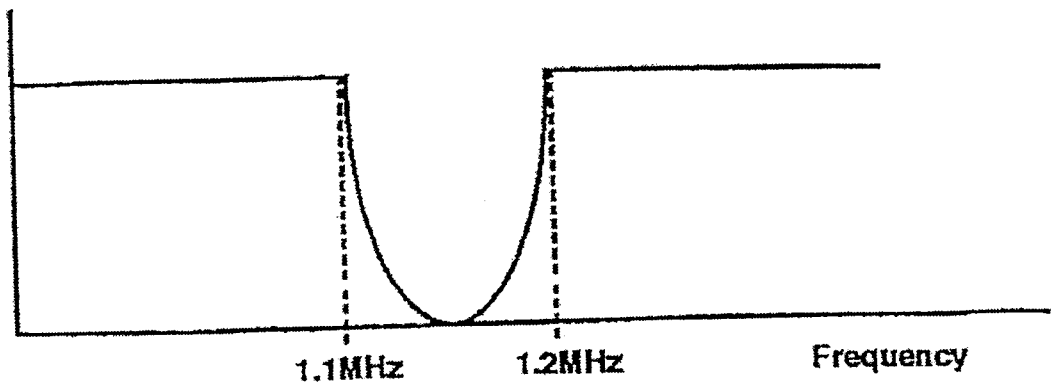
FIG. 6 shows a typical frequency characteristic of a single or composite filter arrangement employed in the network of FIG. 1.

FIG. 6 illustrates a typical frequency response that may be obtained using either a combination of high and low pass filters or a notch filter that performs both functions to provide an effective guard band between ADSL and VDSL traffic on adjacent pairs in a multi-pair cable.

Figure 7:
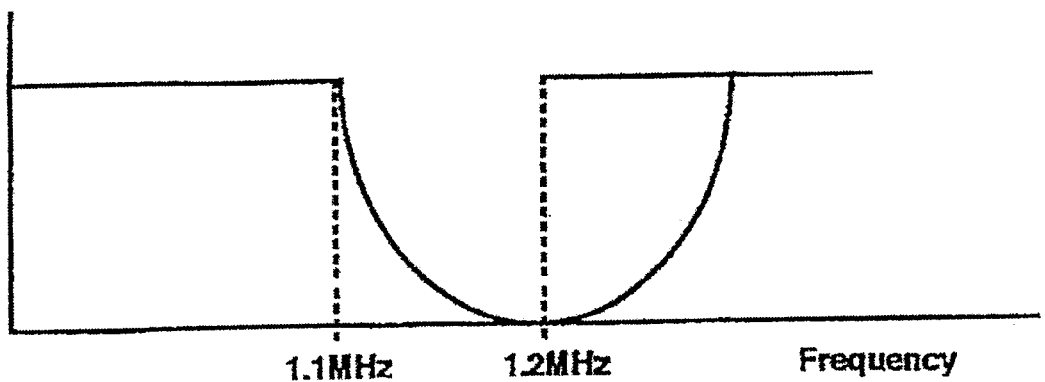
FIG. 7 illustrates the relationship between impedance and frequency for the filter of FIG. 5.

FIG. 7 shows a typical response of the series RLC shunt notch filter with frequency compared with the characteristic impedance $Z_o$ of the twisted copper pair. The typical overall attenuation is about 10 dB at the centre frequency. The filter pass band is sufficiently broad as to extend into each service band edge so as to attenuate interference from the other service to a level at which that interference no longer has a deleterious effect.

Figure 8:
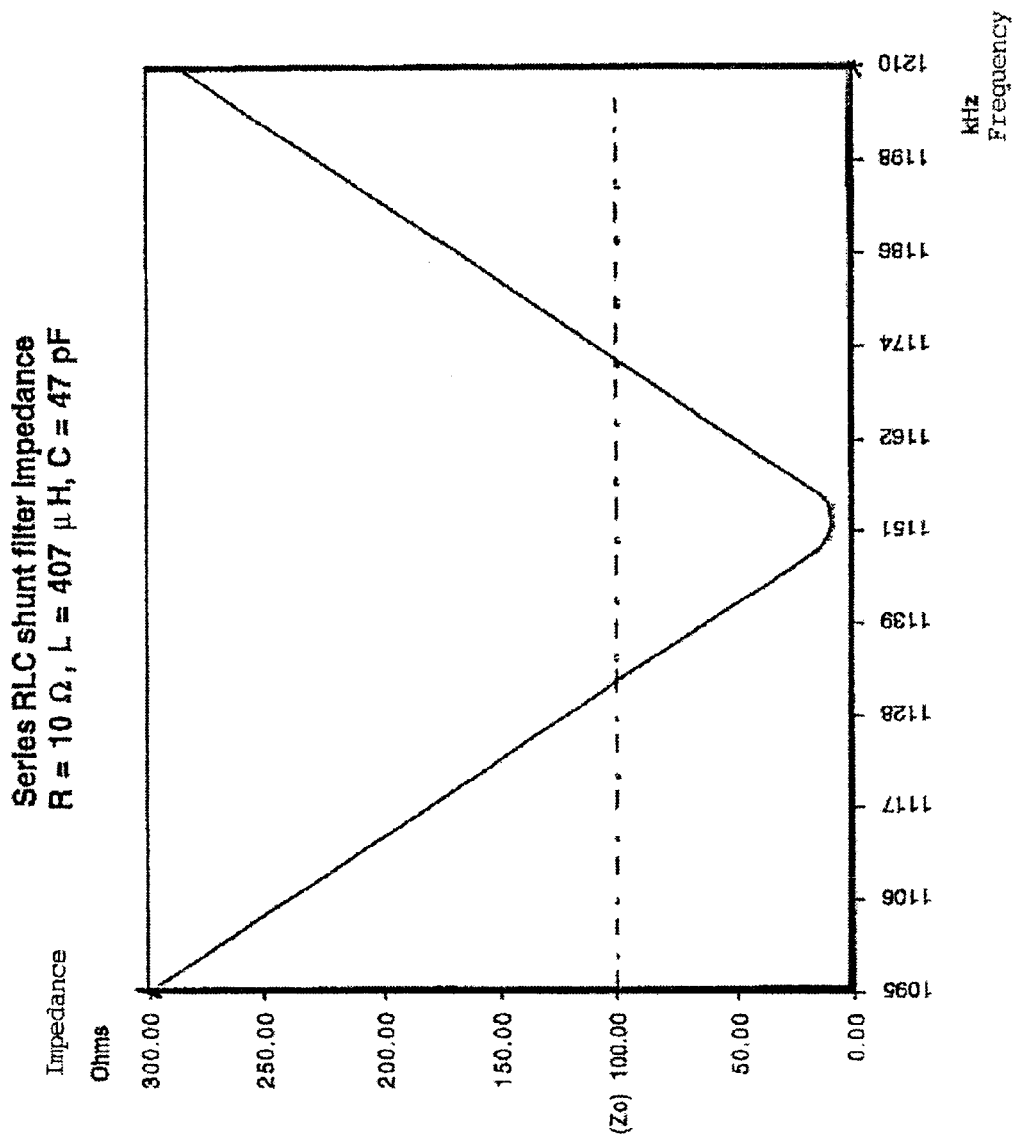
FIG. 8 shows an alternative filter characteristic that may be employed in the network of FIG. 1.

An alternative filter frequency response is illustrated in FIG. 8. Here, the higher frequency end of the notch extends into the designated band of the VDSL service, i.e. the centre frequency of the filter is offset from the centre of the guard band. Typically, the centre frequency is aligned with the lower frequency boundary of the VDSL band. This frequency response is suitable for application to ADSL systems by the insertion of filters at positions 126 or 126a (FIG. 1) where a low pass filter response is required. The final characteristic can then be optimised if required by suitable component adjustment for the best performance of the VDSL system.

Although it is possible to match the precise filter characteristics individually to each subscriber line to accommodate variations in line impedance, we have found that this is not necessary for effective ADSL and VDSL performance. Providing a match for the average line impedance of 100 ohms is sufficient to provide adequate performance on all lines able to carry either of the two services. Thus, the filters can be manufactured using fixed value components and no in-service tuning is required. This reduces manufacturing and installation costs.

It will be understood that the above description of a preferred embodiment is given by way of example only and that various modifications may be made by those skilled in the art without departing from the spirit and scope of the invention.

What is claimed is:

1. A local telecommunications network system arranged to provide a first asymmetric digital subscriber line (ADSL) service in a first frequency band to a first set of subscribers and a second very high bit rate digital subscriber line (VDSL) service in a second frequency band higher than said first frequency band to a second set of subscribers said first and second sets of subscribers being served via respective subscriber loops disposed in mutual adjacency in a common multipair communications cable, the system comprising an exchange or switch to which the subscribers are coupled each via a respective subscriber loop routed via said cable to the exchange, first line card means for applying said ADSL service to selected subscriber loops, second line card means for applying said VDSL service to other selected subscriber loops, a main distribution frame associated with the exchange and whereby each subscriber loop is coupled to its respective line card means, each said subscriber loop having said ADSL service being further coupled via a POTS splitter and the main distribution frame to a further telephony line card, first low pass filter means associated with said first line card means, and second high pass filter means associated with said second line card means, wherein each said filter means is arranged to provide a band edge cut-off of its respective first of second frequency band so as to inhibit mutual crosstalk interference of the digital service-carrying signals within said multipair cable between said first and second frequency bands.

2. A network system as claimed in claim 1, wherein said first and second filters are balanced-T filters.

3. A network system as claimed in claim 1, wherein said first and second filter means each comprise notch filters.

4. A network system as claimed in claim 3, wherein said first and second filter means are integral respectively with said first and second line card means.

5. A network system as claimed in claim 3, wherein said first and second filter means are disposed on a main distribution frame via which the subscriber loops are coupled to their respective line card means.

6. A network system as claimed in claim 5, wherein said first and second filter means each comprise a band-pass shunt coupled across the respective subscriber loop.

7. A method of providing a first asymmetric digital subscriber line (ADSL) service in a first frequency band to a first set of subscribers and a second very high bit rate digital subscriber line (VDSL) service in a second frequency band higher than said first frequency band to a second set of subscribers in a local telecommunications network system said first and second sets of subscribers being served via respective subscriber loops disposed in mutual adjacency in a common multipair communications cable, the system comprising an exchange or switch to which the subscribers are coupled each via a respective subscriber loop routed via said multipair cable to the exchange, first line card means for applying said ADSL service to selected subscriber loops, second line card means for applying said VDSL service to other selected subscriber loops, a main distribution frame associated with the exchange and whereby each subscriber loop is coupled to its respective line card means, each said subscriber loop having said ADSL service being further coupled via a POTS splitter and the main distribution frame to a further telephony line card, wherein the method comprises low pass filtering traffic on subscriber loops carrying said ADSL service, and high pass filtering traffic on subscriber loops carrying said VDSL service so as to inhibit mutual crosstalk interference within said multipair cable of the digital service-carrying signals between said first and second frequency bands.

8. A method as claimed in claim 7, wherein said low pass and high pass filtering is applied respectively to said first and second line card means.

9. A method as claimed in claim 7, wherein said low-pass and high-pass filtering comprises notch filtering.

10. A method as claimed in claim 9, wherein said notch filtering is frequency aligned with the lower frequency edge of said higher frequency band.

* * * * *